(12) United States Patent
Christianson et al.

(10) Patent No.: US 7,124,144 B2
(45) Date of Patent: Oct. 17, 2006

(54) METHOD AND APPARATUS FOR STORING SEMI-STRUCTURED DATA IN A STRUCTURED MANNER

(75) Inventors: David B. Christianson, Seattle, WA (US); Denise L. Draper, Seattle, WA (US); Konstantin L. Kommissarchik, Brier, WA (US)

(73) Assignee: Actuate Corporation, South San Francisco, CA (US)

( * ) Notice: Subject to any disclaimer, the term of this patent is extended or adjusted under 35 U.S.C. 154(b) by 435 days.

(21) Appl. No.: 09/921,010

(22) Filed: Aug. 1, 2001

(65) Prior Publication Data

US 2002/0120630 A1    Aug. 29, 2002

Related U.S. Application Data

(63) Continuation-in-part of application No. 09/921,446, filed on Aug. 1, 2001, and a continuation-in-part of application No. PCT/US01/06755, filed on Mar. 2, 2001, and a continuation-in-part of application No. 09/718,228, filed on Nov. 21, 2000, and a continuation-in-part of application No. 09/517,468, filed on Mar. 2, 2000, and a continuation-in-part of application No. 09/517,131, filed on Mar. 2, 2000.

(51) Int. Cl.
*G06F 17/30* (2006.01)

(52) U.S. Cl. .................................. 707/102; 707/104.1
(58) Field of Classification Search ................ 707/100, 707/102, 104.1
See application file for complete search history.

(56) References Cited

U.S. PATENT DOCUMENTS

| | | |
|---|---|---|
| 4,014,004 A | 3/1977 | Fuller |
| 5,572,583 A | 11/1996 | Wheeler et al. |
| 5,826,258 A | 10/1998 | Gupta et al. |
| 5,852,825 A | 12/1998 | Winslow |
| 5,913,214 A | 6/1999 | Madnick et al. |
| 5,956,720 A | 9/1999 | Fernandez et al. |
| 5,970,490 A | 10/1999 | Morgenstern |
| 5,983,232 A * | 11/1999 | Zhang ..................... 707/102 |
| 6,012,098 A | 1/2000 | Bayeh et al. |
| 6,016,497 A | 1/2000 | Suver |
| 6,052,693 A * | 4/2000 | Smith et al. ............. 707/104.1 |
| 6,076,087 A | 6/2000 | Suciu |

(Continued)

FOREIGN PATENT DOCUMENTS

WO    WO 01/17286    3/2001

OTHER PUBLICATIONS

Kasukawa et al., A New Method for Maintaining Semi-Structured Data Described in XML, Communications, Computers and Signal Processing, 1999 IEEE Pacific Rim Conference on, Aug. 22-24, 1999, pp. 258-261.*

(Continued)

*Primary Examiner*—Leslie Wong
(74) *Attorney, Agent, or Firm*—Beyer Weaver & Thomas LLP

(57) ABSTRACT

In response to the provision of a collection of semi-structured data (or its schema), a mapper generates a structured organization to store the collection of semi-structured data. The mapper further collaterally generates a description of how the semi-structured data are stored under the structured organization. In one embodiment, normalized relational tables are used for the structured organization. In alternate embodiments, non-normalized relational tables or other structured organization may also be used. The reverse, that is, the creation of a semistructured data organization for a collection of structured data may also be performed.

25 Claims, 14 Drawing Sheets

| In-Context 74a | Parent Node 74b | Child Node 74c | Out-Context 74d | Table 74e | Parent Column 74f | Child Column 74g |
|---|---|---|---|---|---|---|
| | person | name | | dir-tbl | per-id | nm-id |
| | name | first | | dir-tbl | nm-id | fn-id |
| | first | data | | dir-tbl | fn-id | fn-data |
| | | | | | | |
| | " | " | " | " | " | " |
| | | | | | | |
| | home | phone | h1 | hm-tbl | hm-id | ph-id |
| h1 | phone | data | | hp-tbl | ph-id | ph-data |
| | work | phone | W1 | wp-tbl | wk-id | ph-id |
| w1 | phone | data | | wp-tbl | ph-id | ph-data |

56"

U.S. PATENT DOCUMENTS

| | | | |
|---|---|---|---|
| 6,094,649 | A | 7/2000 | Bowen et al. |
| 6,154,738 | A | 11/2000 | Call |
| 6,263,332 | B1 | 7/2001 | Nasr et al. |
| 6,269,368 | B1 | 7/2001 | Diamond |
| 6,279,006 | B1 * | 8/2001 | Shigemi et al. ............. 707/101 |
| 6,308,179 | B1 | 10/2001 | Petersen et al. |
| 6,339,776 | B1 | 1/2002 | Dayani-Fard et al. |
| 6,343,287 | B1 | 1/2002 | Kumar et al. |
| 6,356,906 | B1 | 3/2002 | Lippert et al. |
| 6,356,920 | B1 | 3/2002 | Vandersluis |
| 6,389,429 | B1 * | 5/2002 | Kane et al. ................. 707/200 |
| 6,449,620 | B1 * | 9/2002 | Draper et al. ............... 707/102 |
| 6,487,566 | B1 | 11/2002 | Sundaresan |
| 6,507,856 | B1 | 1/2003 | Chen et al. |
| 6,507,857 | B1 | 1/2003 | Yalcinalp |
| 6,516,321 | B1 | 2/2003 | De La Huerga |
| 6,535,896 | B1 | 3/2003 | Britton et al. |
| 6,539,378 | B1 * | 3/2003 | Gupta et al. .................... 707/5 |
| 6,581,062 | B1 * | 6/2003 | Draper et al. ............... 707/100 |
| 6,601,071 | B1 | 7/2003 | Bowker et al. |
| 6,604,100 | B1 | 8/2003 | Fernandez et al. |
| 6,697,818 | B1 * | 2/2004 | Li et al. ................. 707/103 R |
| 6,714,939 | B1 * | 3/2004 | Saldanha et al. ........... 707/102 |
| 6,754,648 | B1 * | 6/2004 | Fittges et al. .................. 707/1 |
| 6,799,184 | B1 * | 9/2004 | Bhatt et al. ................. 707/102 |
| 6,826,553 | B1 * | 11/2004 | DaCosta et al. ............... 707/1 |

OTHER PUBLICATIONS

Lowry, XML Data Mediation and Collaboration: A Comprehensive Architecture and Query Requirements for Using XML to Mediate Heterogeneous Data Sources and Targets, Science Systems, 2001. Proceedings of the 34th Hawaii Inter. Conf. on, Jan. 3, 2001, p. 1-9.*

Goldman, Roy and Widom, Jennifer, "DataGuides: Enabling Query Formulation and Optimization in Semistructured Databases," Proceedings of the 23rd VLDB Conference, Athens, Greece, 1997 (10 pages).

Konopnicki, et al., A Comprehensive Framework for Querying & Integrating WWW Data and Services, IEEE Proceedings Cooperative Information Systems, Sep. 1999, pp. 172-183.

Deutsch, Alin et al., "A Query Language for XML," Computer Networks 31, May 17, 1999 pp. 1155-1169.

Bonifati, Angela et al., "Comparative Analysis of Five XML Query Languages," SIGMOD Record, vol. 29, No. 1, Mar. 2000, pp. 68-79.

Chamberlin, Don., "A Complete Guide to DB2 Universal Database," Morgan Kaufmann Publishers, Inc., 1998, pp. 1-35.

International Search Report for International Application No. PCT/US01/45046, Nimble Technology, Inc., Dec. 22, 2003, pp. 1-6.

U.S. Appl. No. 09/921,446, filed Aug. 1, 2001, Draper et al.

U.S. Appl. No. 09/718,228, filed Nov. 21, 2000, Draper et al.

U.S. Appl. No. 09/517,468, filed Mar. 2, 2000, Draper et al.

U.S. Appl. No. 09/517,131, filed Mar. 2, 2000, Draper et al.

Daniela Florescu et al, "A Performance Evaluation of Alternative Mapping Schemes for Storing XML Data in a Relational Database," an-Experience Paper-, pp. 1-22.

Jayavel Shanmugasundaram et al, "Relational Databases for Querying XML Documents: Limitations and Opportunities," Proc. of the 25th VLDB Conf., Edinburgh, Scotland, 1999, 13 pages.

Colby, Latha S., "A Recursive Algebra and Query Optimization for Nested Relations," Department of Computer Science, Indiana University, Bloomington, IN, pp. 273-283, SIGMOND '95.

Fegaras, Leonidas and Maier, David, "Towards an Effective Calculus for Object Query Languages," Department of Computer Science and Engineering, Oregon Graduate Institute of Science & Technology, Portland, Oregon, pp. 47-58, SIGMOD '95.

Breazu-Tannen, Val et al., "Naturally Embedded Query Languages," Database Theory—ICDT '92, 4th International Conference, Berlin, Germany, Oct. 14-16, 1992 Proceedings.

Abiteboul, Serge, et al., "Foundations of Databases," Chapter 20, pp. 508-541, Addison-Wesley Publishing Company, Inc., 1995.

Accessing Data Using Visual Basic, Copyright 2001 Microsoft Corporation http://msdn.microsoft.com/library/en-us/vbcon98/html/vbconaccessingdata.asp?frame=true [Accessed Nov. 11, 2001].

Forms and Data-Aware Controls, Copyright 2001 Microsoft Corporation http:;//msdn.microsoft.com/library/en-us/vbcon98/.../vbcondataawarecontrols.asp?frame=tru [Accessed Nov. 11, 2001].

Oracle8 Concepts, Release 8.0 Procedures and Packages, Copyright 1997 Oracle Corporation http:;//www.-wnt.gsi.de/oragsidoc/doc_804/database.804/a58227/ch14.html [Accessed Nov. 11, 2001].

Reilly, Douglas, "Using Stored Procedures in Active Server Pages" http://www.ddj.com/documents/s=875/ddj0065e/ [Accessed Nov. 11, 2001].

Nimble Technology Home Page Jul. 17, 2000.

Nimble Technology, "The Nimble Integration Suite™" White Paper, Sep. 11, 2000.

Stored Procedures Overview http://www.va/pubnix.com/man/xdb/sqlref/Overview_413.html [Accessed Nov. 11, 2001].

"W3C XML-QL: A Query Language for XML," Submission to the World Wide Web Consortium, Aug. 19, 1998 http://www.w3.org/TR/1998/NOTE-xml-ql-19980819/ [Accessed Nov. 11, 2001].

W3C Architecture Domain, XML Schema http://www.w3.org/XML/Schema.html [Accessed Nov. 11, 2001].

W3C Document Formats Domain, The Extensible Stylesheet Language (XSL) http://www.w3.org/Style/XSL [Accessed Nov. 11, 2001].

* cited by examiner

```
<Entity A>
    <Entity B>
        <Entity C> Data </Entity C>
        <Entity D> Data </Entity D>
    </Entity B>
    <Entity E>
        <Entity F> Data </Entity F>
    </Entity E>
    <Entity G>
        <Entity F> Data </Entity F>
    </Entity G>
    <Entity H>
        <Entity I> Data </Entity I>
    </Entity H>
    <Entity H>
        <Entity I> Data </Entity I>
    </Entity H>
</Entity A>
```

| A-id | B-id | C-id | C-data | D-id | D-data | E-id | G-id |
|---|---|---|---|---|---|---|---|
| | | | | | | | |
| | | | | | | | |

62

| E-id | F-id | F-data |
|---|---|---|
| | | |
| | | |

64

52'

| G-id | F-id | F-data |
|---|---|---|
| | | |
| | | |

66

| A-id | H-id | I-id | I-data |
|---|---|---|---|
| | | | |
| | | | |

| In-Context 74a | Parent Node 74b | Child Node 74c | Out-Context 74d | Table 74e | Parent Column 74f | Child Column 74g |
|---|---|---|---|---|---|---|
| | | | | | | |
| ← | | | 72 | | | → |
| | | | | | | |
| | | | | | | |

*Fig. 4*

```
<directory> (100)
      <person> (102)
            <name> (104)
                  <first> John </first> (107, 124)
                  <last> Public </last> (108, 126)
            </name> (128)
            <home> (105)
                  <address> (110)
                        <line 1> 123 Main St </line1> (112,130)
                        <city> Anyville </city>(114, 132)
                        <state> WA </state> (116,134)
                        <zip> 98198 </zip>(118,136)
                  </address> (138)
                  <phone> 206-255-1234 </phone> (120, 140)
            </home> (142)
            <work> (106)
                  <phone> 206-555-578 </phone> (122, 144)
            </work> (146)
      <person> (148)
</directory> (150)
```

*Fig. 6A*

| Dir-id | Per-id | Nm-id | Fn-id | Fn-data | ... | Home-id | ... | Work-id |
|---|---|---|---|---|---|---|---|---|
| | | | | | | | | |
| | | | | | | | | |

190

| Home-id | Ph-id | Ph-data |
|---|---|---|
| | | |
| | | |

192

52'

| Work-id | Ph-id | Ph-data |
|---|---|---|
| | | |
| | | |

| In-Context 74a | Parent Node 74b | Child Node 74c | Out-Context 74d | Table 74e | Parent Column 74f | Child Column 74g |
|---|---|---|---|---|---|---|
|  | person | name |  | dir-tbl | per-id | nm-id |
|  | name | first |  | dir-tbl | nm-id | fn-id |
|  | first | data |  | dir-tbl | fn-id | fn-data |
|  |  |  |  |  |  |  |
|  | " | " | " | " | " | " |
|  |  |  |  |  |  |  |
|  | home | phone | h1 | hm-tbl | hm-id | ph-id |
| h1 | phone | data |  | hp-tbl | ph-id | ph-data |
|  | work | phone | W1 | wp-tbl | wk-id | ph-id |
| w1 | phone | data |  | wp-tbl | ph-id | ph-data |

```
<xsl:stylsheet xmins:xsl=http://www.w3.org/XSL/Transform/1.0>

<xsl:template match:"/">
            <result>
                    <xsl: apply-templates
                            select="companyrecords/employees/employee"/>
            </result>
    </xsl:template>

<xsl:template match:"employee">
            <xsl:variable name="depid" select=department/@idref/>
            <person>
                    <xsl: apply-templates select="name"/>
                    <number><xsl:value-of select="phone"/></number>
                    <depname>
                            <xsl: apply-templates
                                    select="//department[@id=$depid]/name"/>
                    </depname>
            </person>
    </xsl:template>

<xsl:template match:"employee/name">
            <xsl:value-of select="first" />
            <xsl: text> </xsl:text>
            <xsl:value-of select="last" />
    </xsl:template>

<xsl:template match:"department/name">
            <xsl:value-of select="." />
    </xsl:template>

</xsl:stylesheet>
```

```
<companyrecords>
    <employees>
        <employee>
            <name><first>fname</first><last>lname</last></name>
            <ssn>ssn</ssn>
            <department idref=deptid/>
            <phone>xxx-xxxx</phone>
        </employee>
    </employees>
    <departments>
        <department id=deptid>
            <name> dept name </name>
        </department>
    </departments>
</companyrecords>
```

(QueryLoop "Select"  name.first, name.last, employee.phone, name2.pcdata,
        From       companyrecords, multiemployee,
                     Employee, name, companyrecords as cr2,
        Where     companyrecords.employees = multiemployee.id AND
                     cr2.departments = multidepartment.id AND
                     multidepartment.department = department. id AND
                     department.id = employee.idref,
                     department.name = name2.id)

(CreateElement "result")
    (Group "") // empty group operation groups all inside 'result"
        (CreateElement "person")
            (CreateText"$QL.1 $QL.2")
            (CreateElement "phone" body="$QL.3")
            (CreateElement "depname" body="$QL.4")

*Fig. 12C*

METHOD AND APPARATUS FOR STORING SEMI-STRUCTURED DATA IN A STRUCTURED MANNER

CROSS-REFERENCE TO RELATED APPLICATIONS

This application is a continuation-in-part of U.S. patent application Ser. No. 09/517,131, entitled "METHOD AND APPARATUS FOR STORING SEMI-STRUCTURED DATA IN A STRUCTURED MANNER" filed on Mar. 2, 2000; International Application No. PCT/US01/06755, entitled "METHOD AND APPARATUS FOR STORING SEMI-STRUCTURED DATA IN A STRUCTURED MANNER" filed on Mar. 2, 2001; U.S. patent application Ser. No. 09/517,468, entitled "METHOD AND APPARATUS FOR GENERATING INFORMATION PAGES USING SEMI-STRUCTURED DATA STORED IN A STRUCTURED MANNER" filed on Mar. 2, 2000; U.S. patent application Ser. No. 09/718,228, entitled "TECHNIQUES FOR ENCAPSULATING A QUERY DEFINITION" filed Nov. 21, 2000; and U.S. patent application Ser. No. 09/921,446, entitled "NESTED CONDITIONAL RELATIONS (NCR) MODEL AND ALGEBRA" filed Aug. 1, 2001; which are hereby incorporated by reference in their entirety.

BACKGROUND OF THE INVENTION

1. Field of the Invention

The present invention relates to the field of data processing. More specifically, the present invention relates to the storage of semi-structured data.

2. Background Information

Increasingly, because of its richness in functions and extensibility, information pages, such as web pages, are being constructed using the extensible style language (XSL) and semi-structured data, such as extensible markup language (XML) encoded data.

"Semi-structured data" refers to data that has structure, but where the contents of particular structural elements need not be consistent. To facilitate this characteristic, data are "self-describing." For example, in a "person" application, a person can be validly defined by semi-structured data with only a subset of all possible data associated with a person, e.g., by only a last name and a telephone number, or a first name, last name, and address, or some other combinations. Or, a person may be defined with additional data not previously seen, such as an employer name, an employer address, and an employer telephone number. Thus, each semi-structured "person" definition may vary.

"XML" is one example of a language for representing semi-structured data. XML is a subset of the Standard Generalized Markup Language (SGML), a system promulgated by the International Standards Organization (ISO) for organizing and tagging elements of a document. Interpretation of the XML tags, however, is left to an interpreter. Thus, XML is adaptable to a wide variety of purposes. In particular, since XML is based on plain text, and therefore, XML based documents can be received and processed by many different computing platforms, such as by a platform-independent browser or other networked application programs.

"Structured data," in contrast, refers to data formats such as those used for databases, spreadsheets, address books, and so forth, where in each case, the data format is well-defined by a schema and essentially inflexible. For example, in the database context, a database can be defined to store data according to some data-storage requirements. The storage requirements, e.g., the schema or nature of valid input, are known in advance, and the database is defined according to the structure of the potential input data. If the database were storing information about person, such as first name, last name, address, telephone number, and employer, every person record in the database would have space allocated for the information being tracked. Hence, the database is structured.

An example of a structured database is the relation database, also referred to as SQL database, where SQL is the name of its query language, Structured Query Language. In addition to being "inflexible," unlike semi-structured data, SQL databases are also platform dependent. Nevertheless, because of its availability as well as robustness, recent research has turned towards using structured databases, such as a SQL database, to store and retrieve information defined by semi-structured data.

One significant issue, however, is how to convert from semi-structured data, such as XML encoded data, to structured data storage, such as a SQL database. Towards this end, various approaches have been proposed. For example, see Florescu et al., *A Performance Evaluation of Alternative Mapping Schemes for Storing XML Data in a Relational Database,* Rapport de Recherche No. 3680, INRIA, Rocquencourt, France (May 1999), discusses techniques and issues related to using directed graphs to represent semi-structured data. And, Shanmugasundaram et al, *Relational Databases for Querying XML documents: Limitations and Opportunities,* Proceedings of the $25^{th}$ VLDB Conference, Edinburgh, Scotland (1999), discusses using XML document type descriptors (DTDs) to convert XML documents to relational tuples.

A significant limitation of these and other current conversion approaches is that mapping between structured and semi-structured data formats is by way of applying a fixed set of "rules" to perform the mapping. That is, in each of the these techniques, one and only one mapping is possible. For a given semi-structured input, the conversion rules control conversion into corresponding structured database output. The conversion is not flexible.

Thus, a more flexible approach to handling semi-structured data in a structured manner is desired.

SUMMARY OF THE INVENTION

In accordance with a first aspect of the present invention, a mapper generates a structured organization to store a collection of semi-structured data. Collaterally, the mapper also generates a description of how the semi-structured data are stored under the structured organization.

In accordance with a second aspect of the present invention, a mapper generates a semi-structured data organization for a collection of structured data. In like manner, the mapper also collaterally generates a description of correspondence between the semi-structured data organization and the structured data.

BRIEF DESCRIPTION OF DRAWINGS

The present invention will be described by way of exemplary embodiments, but not limitations, illustrated in the accompanying drawings in which like references denote similar elements, and in which:

FIG. 3 illustrates a structured organization for storing the semi-structured data of FIGS. 2a–2b, in accordance with one embodiment;

FIG. 4 illustrates a description of correspondence between the semi-structured data and the structured storage, in accordance with one embodiment;

FIGS. 6a–6b illustrate an example semi-structure data and its logical representation;

FIG. 7 illustrates an example structured data for storing the semi-structured data of FIGS. 6a–6b;

FIG. 8 illustrates an example description of correspondence between the semi-structured data and the structured storage of FIGS. 6a–6b and 7;

FIGS. 12a–12c illustrate an example pre-processing of an information page;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as tables, keys, identifiers and so forth, commonly employed by those skilled in the art to convey the substance of their work to others skilled in the art. Parts of the description will be presented in terms of operations performed by a computer system, using terms such as parsing, accessing, retrieving, and so forth. As well understood by those skilled in the art, these quantities take the form of electrical, magnetic, or optical signals capable of being stored, transferred, combined, and otherwise manipulated through mechanical and electrical components of a digital system 6; and the term digital system include general purpose as well as special purpose data processing machines, systems, and the like, that are standalone, adjunct or embedded.

Various operations will be described as multiple discreet steps performed in turn in a manner that is most helpful in understanding the present invention, however, the order of description should not be construed as to imply that these operations are necessarily order dependent, in particular, the order the operations are presented. Furthermore, the phrase "in one embodiment" will be used repeatedly, however the phrase does not necessarily refer to the same embodiment, although it may.

Figure 1:
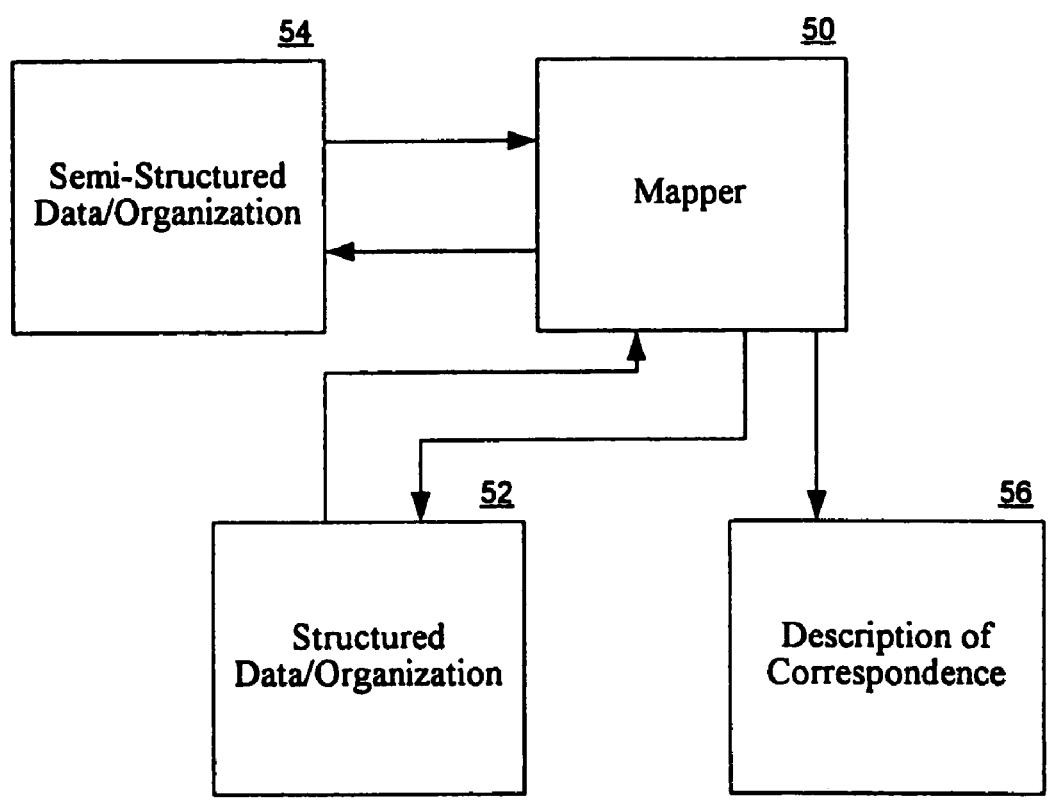
FIG. 1 illustrates an overview of the mapping aspect of the present invention.

Referring now to FIG. 1, wherein a block diagram illustrating an overview of the data representation aspect of the present invention, in accordance with one embodiment. As illustrated, mapper 50 incorporated with the teachings of the present invention, is equipped to generate structured organization 52 to store semi structured data 54. Collaterally, mapper 50 also generates description 56 of how semi-structured data 54 are stored under structured organization 52. As will be described in more detail below, the collateral generation of description 56 advantageously enables mapper 50 to generate structured organization 52 in any one of a number of approaches. That is, under the present invention, unlike any of the prior art techniques, the generation of structured organization 52 is not bounded or fixed to one particular mapping approach.

Figures 2A, 2B:
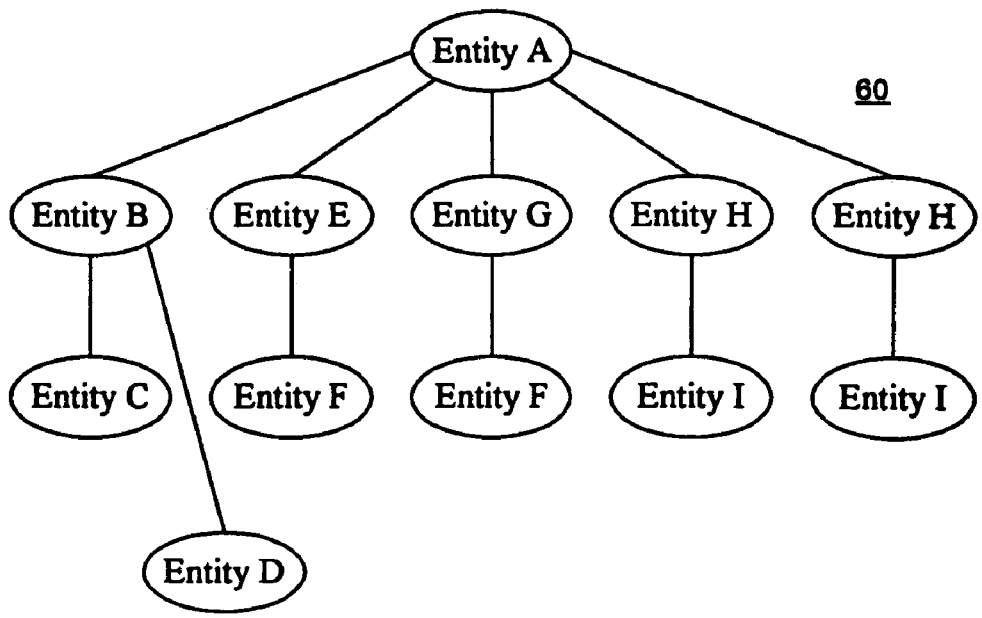
FIGS. 2a–2b illustrate semi-structure data and its logical representation, in accordance with one embodiment.

FIGS. 2a–2b illustrate semi-structured data and its logical representation, in accordance with one embodiment. As illustrated, semi-structured data 54' includes a number of entities or data elements, each delineated by a pair of tags, e.g. entity A by tags <entity A> and </entity A>, entity B by tags <entity B> and </entity B>, and so forth. Some entities, like entities F and H have multiple instantiations. The entities/instantiations have an hierarchical relationship to each other; and may be logically represented by tree structure 60, having corresponding number of nodes, one for each entity/instantiation, and edges interconnecting the nodes whose represented entities/instantiations are direct ancestors/descendants of each other, as shown.

Entity A is said to be the parent entity of entities B, E, G and H. Entities B, E, G and H are said to be the children entities of entity A. Similarly, entity B is said to be the parent entities for entities C and D respectively, whereas entities E, G and the two instantiations of entity H are the parent entities for the two instantiations of entity F, and the two instantiations of entity I respectively. The two instantiations of entity F, and the two instantiations of entity I are said to be the children entities of E, G and the two instantiations of entity H respectively.

The two instantiations of entity F are said to be instantiated in two contexts, the context of entity E and the context of entity G. An example is a "phone" entity instantiated in the context of a "home" entity, and in the context of a "work" entity, i.e. in first case, a home phone number, and in the second case, a work phone number. The two instantiations of entities H and I are said to be repeated occurrences of the entities. An example is an "offspring" entity and its descendant "offspring name" entity, where each occurrence represents a son/daughter of a person.

FIG. 3 illustrates a structured organization for storing the semi-structured data of FIGS. 2a–2b, in accordance with one embodiment. As illustrated, structured organization 52' includes four relational tables 62–68. Table 62 includes one column each for storing identifiers of entities A, B, C, D, E, and G, and data for entities C and D. Table 64 includes one column each for storing identifiers for entities E and F, and data for entities F, whereas table 66 includes one column each for storing identifiers for entities G and F, and data for entities F. Similarly, table 68 includes one column each for storing identifiers for entities A, H and I, and data for entity I. The organization of these relational tables is characterized by the fact that entities having the possibility of multiple instantiations are stored in separate tables. The approach is said to be a normalized organization of the relational tables.

FIG. 4 illustrates description of correspondence between the semi-structured data and the generated structured organization, in accordance with one embodiment. As illustrated, description 56' is a meta-table having a number of row entries 72, one for each pair of parent and child nodes. Meta-table 56' includes seven columns 74a–74g, storing identifiers for the in-context, the parent node, the child node, the out-context, the storage table, the parent column and the child column. That is, columns 74a–74d track the hierarchical information of semi-structured data 54, and columns 74e–74g track the storage location information of the structured organization 52. Additionally, meta-table 56' includes a number of miscellaneous columns (not shown) for storing various flags and annotations. These miscellaneous flags and annotations include e.g. a flag that distinguishes between an "element" versus an "attribute," an annotation that denotes whether a child can occur more than once with respect to a parent, another annotation that denotes whether the child must occur at all. Each row entry 72 always contains information in columns 74b–74c and 74e–74g. Row entries 72 for parent-child pairs involving multiple instantiations also contain information in the "context" columns 74a and 74d. Where applicable, row entries 72 also include the aforementioned flags and annotations.

Figure 5:
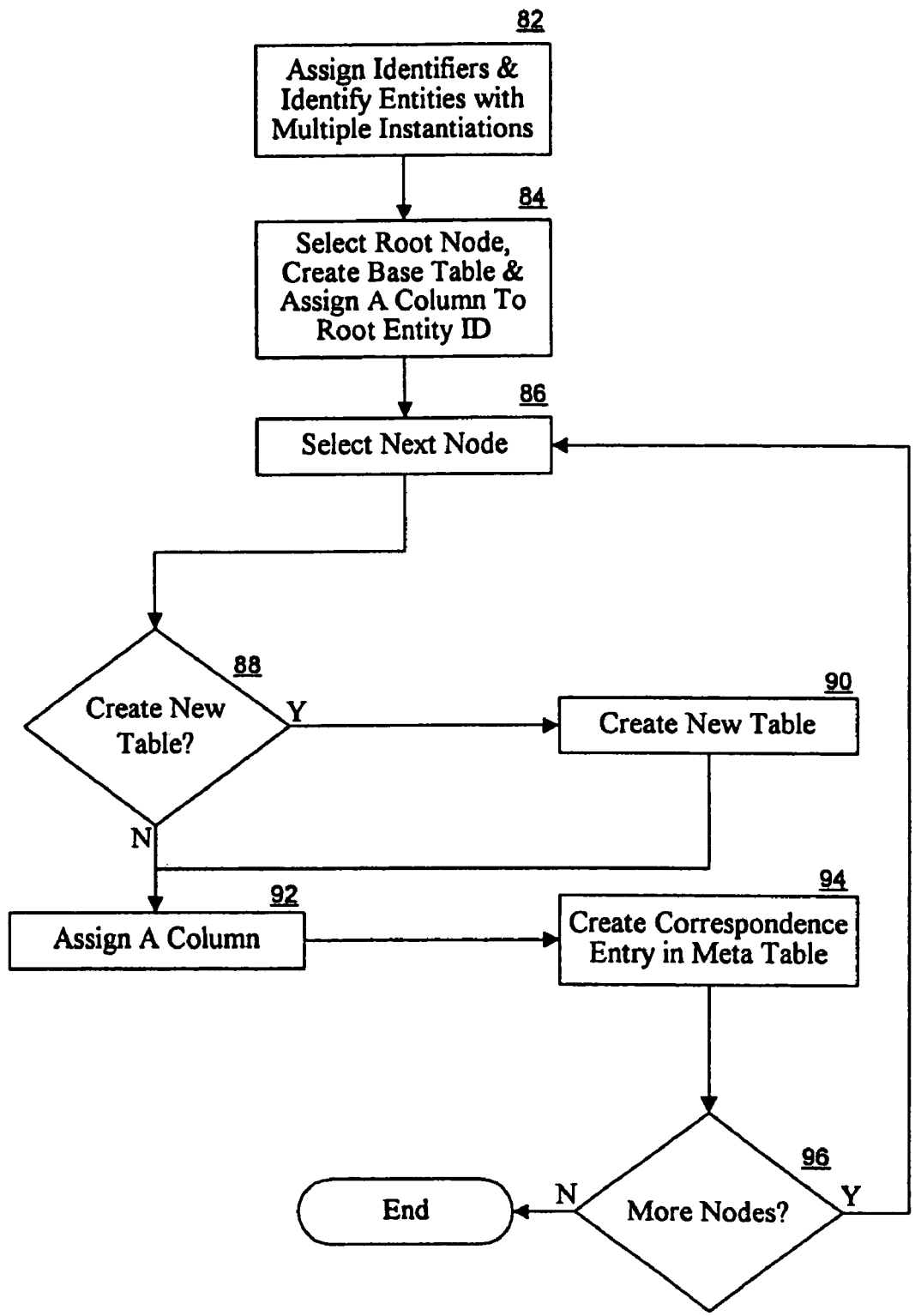
FIG. 5 illustrates the operation flow of the mapper of FIG. 1, in accordance with one embodiment.

FIG. 5 illustrates the operation flow for mapper 50, in accordance with one embodiment. In this embodiment, it is assumed that structured organization 52 is generated in the normalized approach described earlier, referencing FIG. 3, and meta-table 56' of FIG. 4 is employed for description 56. As illustrated, at 82, mapper 50 traverses a logical representation of semi-structured data 54 assigning identifiers to all entities (and if applicable, their multiple instantiations). At the same, mapper 50 also keeps track of all entities with multiple instantiations, as well as setting the applicable flags and recording the applicable annotations. At 84, mapper 50 selects the root node, creates a base table, and assigns a first column of the base table for the root entity.

At 86, mapper 50 selects a next node. At 88, mapper 50 determines if a new table should be created to store data associated with the entity. For the illustrated embodiment, a new table is created if the entity is one that has multiple instantiations, and a separate table has not been previously created. In alternate embodiments, other criterion or criteria may be employed to determine whether a new table is to be employed or not. If a new table is to be employed, the new table is created at 90. Otherwise 90 is skipped. At 92, a column is assigned to store the identifier/data associated with the entity. At 94, an entry is added to meta-table 56' to keep track of where the identifier/data of the entity is stored. As described earlier, the entry includes parent node information, its own node information, the table name/identifier, the column location of the parent, and its own column location. For entity or parent entity with multiple instantiations requiring context differentiation, either an out-context identifier or an in-context identifier is also stored. Context identifiers may be formed in any manner. Where applicable, the entry also includes the applicable flags and annotations.

At 96, mapper 50 determines if it has processed all nodes. If additional nodes are to be processed, operations 86–94 are repeated. The operations are repeated as many times as it is necessary to process all nodes. In due course, all nodes are processed. At such time, the processing terminates.

Figure 6B:
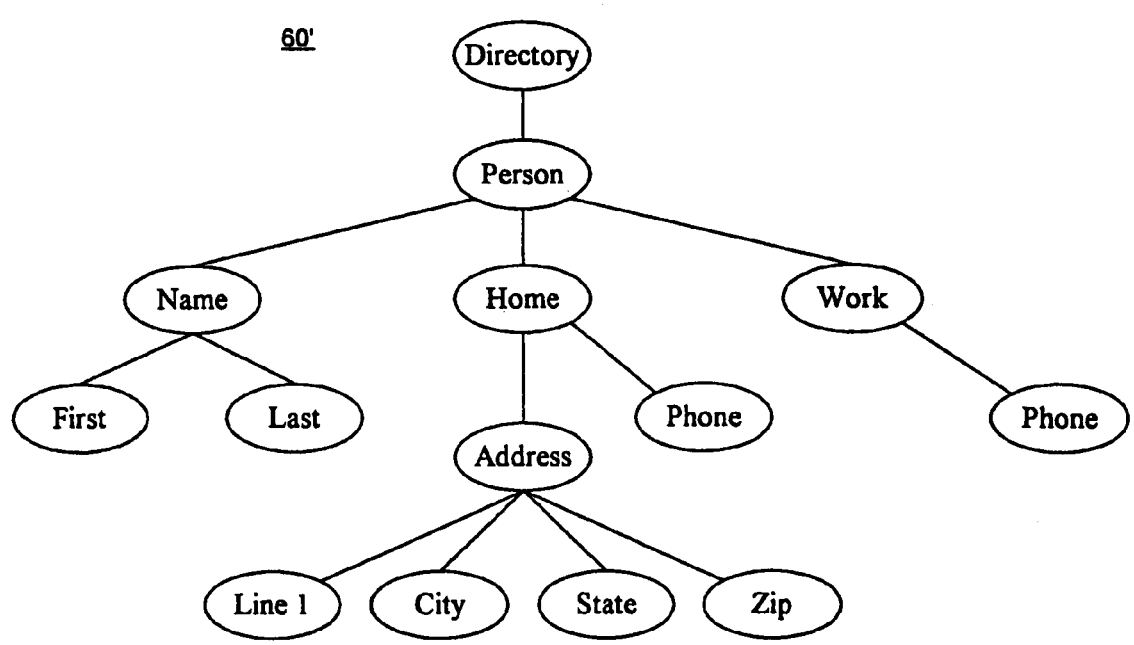

FIGS. 6a–6b illustrate an example semi-structured data 54" and its logical representation. The example "directory" semi-structured data 54," delineated by the <directory> and </directory> tags 100 and 150, as illustrated in FIG. 6a, includes the entities "person," "name," "first name," "last name," "home," "address," "line 1," "city," "state," "zip," "phone" (in the context of "home"), "work," and "phone" (in the context of "work"), delineated by the respective tag pairs, i.e. 102 and 148, 104 and 128, and so forth. The example "directory" semi-structured data may be logically represented by tree structure 60' of FIG. 6b. Tree structure 60' includes root node "directory" 162, "person" node 164, "name" node 166, "first name" node 168, "last name" node 170, "home" node 172, "address" node 174, "line 1" node 176, "city" node 178, "state" node 180, "zip" node 182, "home phone" node 184, "work" node 186, and "work phone" node 188.

FIG. 7 illustrates the resulting structure organization 52" generated by mapper 50 to store the semi-structured data 54", in accordance with the earlier described embodiment referencing FIGS. 3 and 5. As illustrated, structure organization 52" includes tables 190–194. Directory table 190 stores person id, name id, first name id, first names, last name id, last names, home id, address id, line 1 id, line 1 data, city id, city names, state id, state names, zip id, zip code, and work id (not all columns are shown). Home phone table 192 stores home id, phone id, and phone numbers (home), whereas work phone table 914 stores work id, phone id and phone numbers (work).

FIG. 8 illustrates the resulting meta-table 56" generated by mapper 50 to store the correspondence between the semi-structured data of FIG. 6a–6b and the structured organization of FIG. 7, in accordance with the earlier described embodiment referencing FIGS. 4–5. As described earlier, each entry contains the information for each parent-child node pair pointing to the table and column storage locations for the parent and child identifier/data (not all rows are shown). The entries for the home and phone node pair, and the work and phone node pair include the storage of a context qualifier (arbitrarily named as "h1" and "w1") identifying which phone and data node pair points to the correct storage locations for the phone data. For ease of understanding, the miscellaneous flags and annotations are omitted.

Note that in addition to the already mentioned advantage that mapper 50 may employ any one of a number approaches to generate structured organization 52, the present invention also allows a data base administrator (DBA) to manually intervene and adjust the generated structured organization 52. The DBA may easily maintain the correspondence by making like kind adjustments to the collaterally generated meta-table 56. Such adjustments are often desirable as in real life applications, by virtue of the number of entities involved, which is typically much larger than the illustrated examples (as they were kept small for ease of understanding), the generated structured organization 52 may not be as efficient as desired.

Referring now back to FIG. 1, in accordance with another aspect of the present invention, mapper 50 incorporated with the teachings of the present invention, is also equipped to generate semi-structured data organization 54 for a collection of structured data 52. In like manner, mapper 50 also collaterally generates description 56 of correspondence between semi-structured data organization 54 and structured data 52. Thus, the present invention also advantageously enables legacy structured data to be employed in a semi-structured manner.

Figure 9:
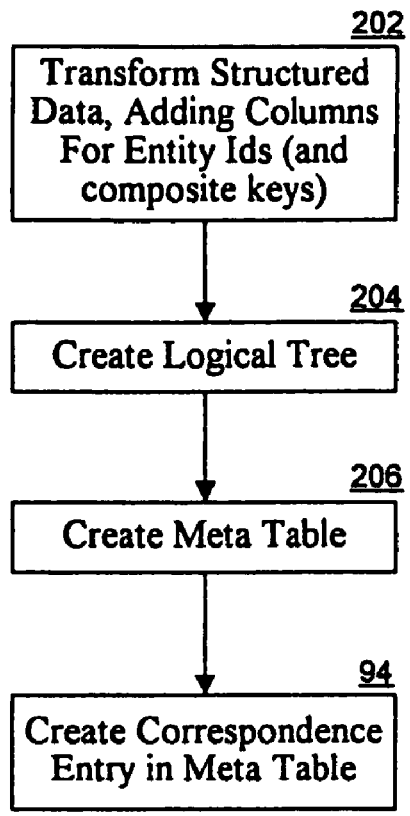
FIG. 9 illustrates the operational flow of mapper 50 for generating semi-structured organization for structured data.

FIG. 9 illustrates the operational flow of mapper 50 for generating semi-structured organization 54 for structured data 52. At 202, mapper 50 transforms structured data 52 adding corresponding companion columns to the tables to store entity identifiers for the stored entity data. In one embodiment, mapper 50 also adds corresponding columns to the tables to store a composite key formed with the access keys of the tables. For example, in a table, having two columns storing the last and first names of persons as accessing keys, a column is added to store a composite key formed with the last and first names of the persons. At 204, mapper 50 constructs a logical tree structure similar to the ones illustrated in FIGS. 2b and 6b, based on the columns storing entity identifiers. At 206, mapper 50 creates meta table 56 as described earlier. At 208, mapper 50 generates semi-structured organization 54 using the generated logical tree structure.

Accordingly, the vast volume of legacy structured data may be employed in modern information pages using semi-structured data.

Figure 10:
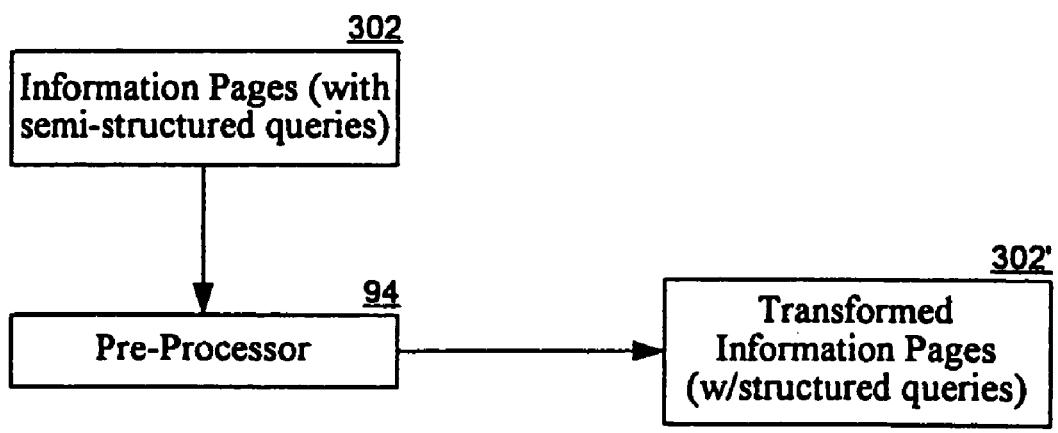
FIG. 10 illustrates the pre-processing aspect of the present invention.

FIG. 10 illustrates an overview of yet another aspect of the present invention. Shown are information pages 302 formed using a language that allows for the use of semi-structured queries, such as XSL, and employment of semi-structured data, like XML encoded data, stored in a structured manner. The correspondence between the semi-structured data and the structured organization are described using the earlier described meta-table or a description mechanism of like kind. Preprocessor 304, incorporated with the teachings of the present invention, is equipped to pre-compile information pages 302, to generate pre-processed information pages 302', replacing the semi-structured queries with equivalent structured queries to retrieve the required data from the structured data storage. Thus, at fulfillment time, that is in response to a request for one of the information pages, the requested information page may be dynamically completed with the required data, without having to determine in real time where the required semi-structured data are stored in the structured data storage. As a result, a request may be fulfilled with a shorter latency. In other words, the present invention also advantageously enables speed up of fulfillment of requested information pages that have to be dynamically completed with semi-structured data retrieved in real time.

Figure 11:
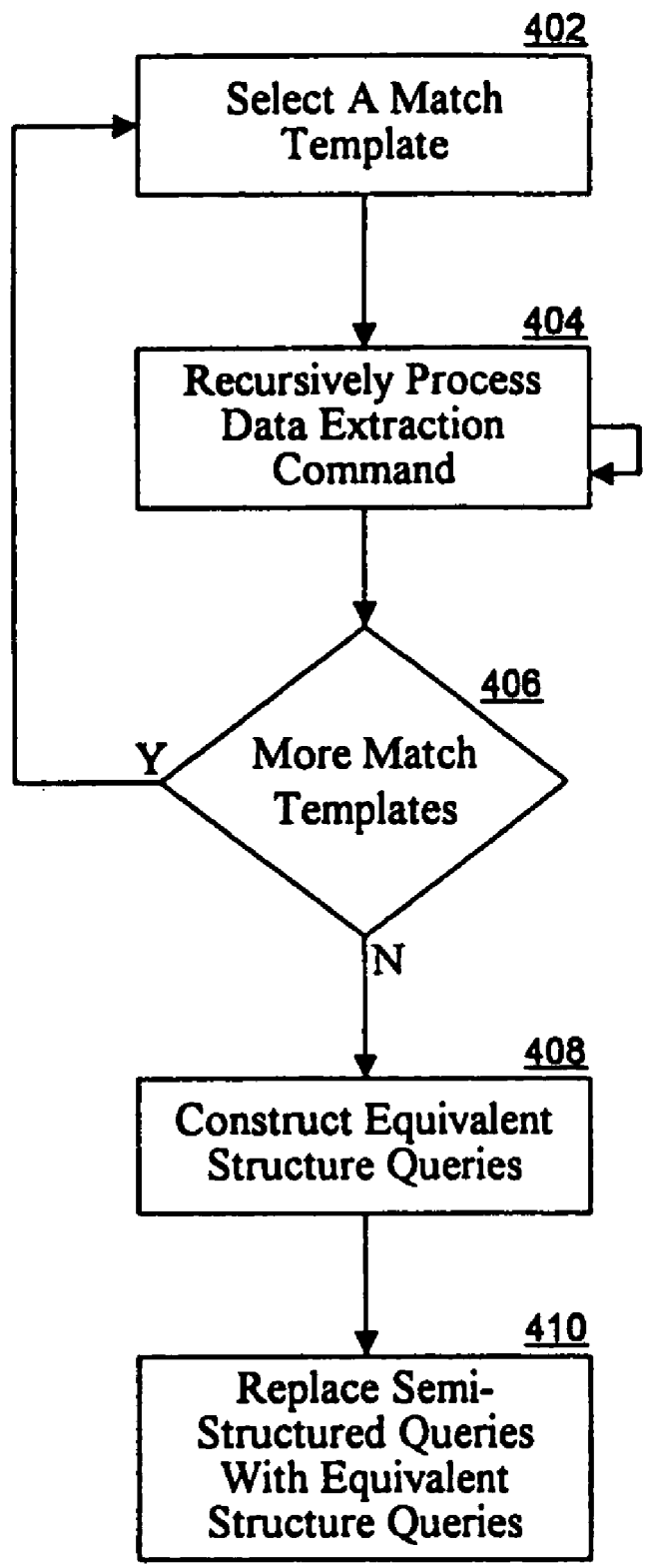
FIG. 11 illustrates the operation flow of the pre-processor of FIG. 10, in accordance with one embodiment.

FIG. 11 illustrates the operational flow of pre-processor 304, in accordance with one embodiment. At 402, pre-processor 304 selects a match template for preprocessing. At 404, pre-processor 304 recursively pre-processes data extraction commands within the selected match template, using the above described meta-table. Pre-processor 304 identifies the entity of the semi-structured data, whose data are to be extracted. Pre-processor 304 then uses the meta-table to determine the storage locations for the entity data in the structured data storage. Where necessary, pre-processor 304 cumulates the join conditions for joining the relational tables of the structured data storage to extract the required entity data. At 406, pre-processor determines if all match templates have been processed. If additional match templates are to be processed, operations 402–404 are repeated. Operations 402–404 are repeated as many times as necessary, until all match templates are processed. In due course, all match templates are processed. At such time, 408, pre-processor 304 uses the cumulated information and generates equivalent structured queries to retrieve the required data from the structured data storage. Where applicable, the generation may include generation of an associated control structure to control the repeated execution of a structured query, to iteratively obtain all or a subset of the required data from the structured data storage. At 410, preprocessor 304 replaces the semi-structured query/queries with the generated equivalent structured query/queries, and associated control structure or structures, if any.

Thus, pre-processed information pages 302' are now primed to readily respond to their requests. FIGS. 12a–12c illustrate a specific example of pre-processing an information page. Shown in FIG. 12a is an example XSL document 502 having a number of match templates. Each matching template includes one or more data extraction commands, such as select, value-of, apply template, and the like. FIG. 12b illustrates a schema of the underlying semi-structured data 504. FIG. 12c illustrates the resulting replacement structured query ("Query Loop") 506, including the join conditions, and the control structure to re-use the structured query ($QL.1, $QL.2, and so forth).

Figure 13:
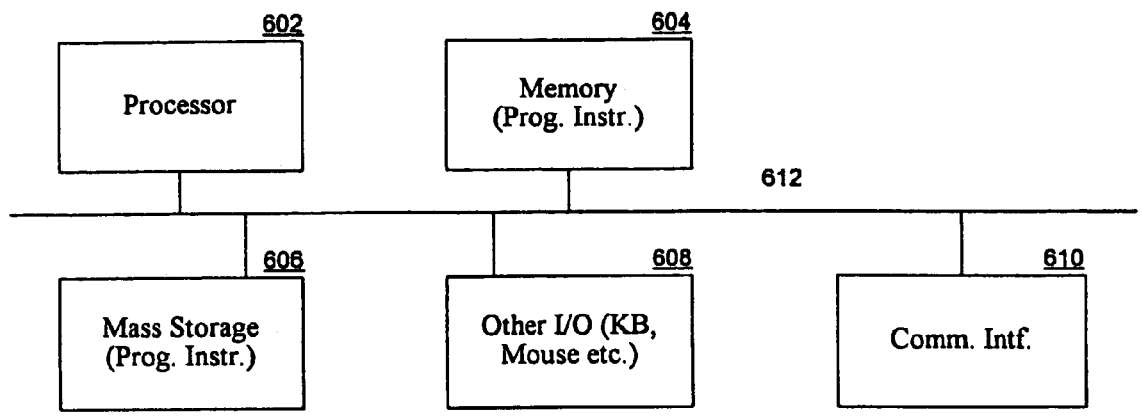
FIG. 13 illustrates a computing environment suitable for practicing the mapping and pre-processing aspects of the present invention.

FIG. 13 illustrates an example computing environment suitable for practicing the mapping and the pre-processing aspects of the present invention. Example computing environment 600 includes one or more processors 602 and system memory 604. Additionally, computing environment 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, the buses are bridged by one or more bus bridges (not shown). Each of these elements perform its conventional functions known in the art. In particular, system memory 604 and mass storage 606 are employed to store a working copy and a permanent copy of the programming instructions implementing the earlier described mapper and/or preprocessor of the present invention. In one embodiment, the implementing programming instructions are a subset of a larger collection of programming instructions implementing a development toolkit that facilitates development of applications that access databases. In another embodiment, the implementing programming instructions are a subset of a large collection of programming instructions implementing a database manager and related functions. The permanent copy of the programming instructions may be loaded into mass storage 606 in the factory, or in the field, through a distribution medium (not shown) or through communication interface 610 (from a distribution server (not shown)). The constitution of these elements 602–612 are known, and accordingly will not be further described.

Figure 14:
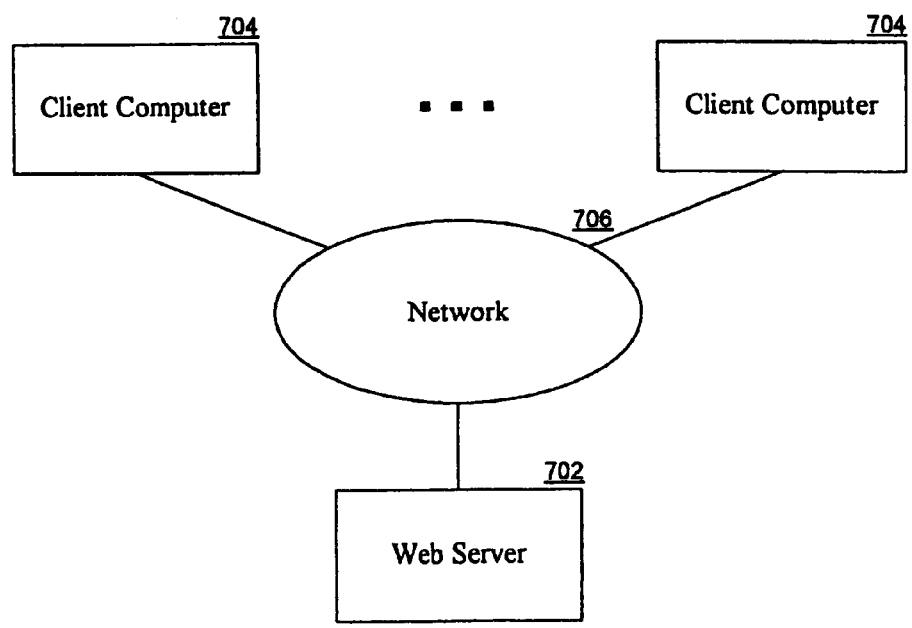
FIG. 14 illustrates a network environment suitable for using the information pages pre-processed in accordance with the present invention.

FIG. 14 illustrates an example network environment suitable for exploiting information pages pre-processed in accordance with the present invention. Network environment 700 includes web server 702 and a number of client computers 704 coupled to web server 702 through network 706. Web server 702 is provided with information pages formed with a language like XSL, using semi-structured data, like XML encoded data, stored in a structured data storage, and the information pages are pre-processed as earlier described, i.e. with the semi-structured queries being replaced by equivalent structured queries (and associated control structures, if any). Client computers 704 request selected ones of the information pages from web server 702. Web server 702 fulfills the requests, dynamically completing the information pages, retrieving the required data from the structured data storage, using the replacement equivalent structured queries. Accordingly, the requests of client computers 704 are fulfilled with shorter latencies.

Web server 702 and client computers 704 are intended to represent a broad range of server and computers known in the art. Network 706 is intended to represent a broad range of private and public networks, such as the Internet, constituted with networking equipment, such as routers, gateways, switches and the like.

Thus, a method and apparatus for storing semi-structured data in a structured manner, and for generating information pages using semi-structured data so stored have been described.

Tables 1–3 illustrate an example of structured data that is stored in a relational database. The relational database contains three tables: DEPARTMENTS table, EMPLOYEES table, and BUILDINGSDOCS table.

TABLE 1

DEPARTMENTS

| Name | Contact |
|---|---|
| Finance | E1247 |
| Engineering | E3214 |

TABLE 2

EMPLOYEES

| ID | Fname | Lname | Dept | Bldg | Office | Manager |
|---|---|---|---|---|---|---|
| E0764 | Bobby | Darrows | Finance | B | 102 | E1247 |
| E0334 | Alice | LeGlass | Finance | B | 103 | E1247 |
| E1247 | David | Winston | Finance | B | 110 | NULL |
| E3214 | David | McKinzie | Engineering | L | NULL | E1153 |
| E0868 | Misha | Niev | Engineering | L | 15 | E1153 |
| E0012 | David | Herford | Engineering | M | 332 | E1153 |
| E1153 | Charlotte | Burton | Engineering | M | 330 | E0124 |
| E0124 | David | Wong | Engineering | L | 12 | NULL |

TABLE 3

BUILDINGSDOCS

| Building | Office | Phone | MaintContact |
|---|---|---|---|
| B | 102 | x1102 | E0764 |
| B | 103 | x1103 | E0764 |
| B | 110 | x1110 | E0764 |
| L | lobby | x0001 | E3214 |
| L | 12 | x0120 | E3214 |
| L | 15 | x0150 | E3214 |
| M | 330 | x2330 | E3214 |
| M | 332 | x2332 | E3214 |

The DEPARTMENTS table contains one row for each department of an organization. As illustrated by Table 1, the organization has a finance and an engineering department. The DEPARTMENTS table contains two columns: name and contact. The name column contains the name of the department, and the contact column contains the employee identifier of the contact person for the department. For example, the first row of the table indicates that the department is "finance" and that the contact employee is "E1247." The EMPLOYEES table contains a row for each employee in the organization. Each row includes seven columns: ID, Fname, Lname, Dept, Bldg, Office, and Manager. The ID column uniquely identifies the employee, the Fname column contains the first name of the employee, the Lname column contains the last name of the employee, the Dept column identifies the employee's department, the Bldg column identifies the building in which the employee is located, the Office column identifies the employee's office within the building, and the Manager column identifies the employee's manager. The Dept column contains one of the values from the Name column of the DEPARTMENTS table. The BUILDINGSDOCS table contains a row for each office within each building of the organization. The BUILDINGSDOCS table contains four columns: Building, Office, Phone, and MaintContact. The Building column identifies a building, the Office column identifies an office within the building, the Phone column contains the phone number associated with that office, and the MaintContact column identifies the employee who is the maintenance contact for the office. The combination of the Building and Office columns uniquely identifies each row. The Bldg and Office columns of the EMPLOYEES table identifies a row within the BUILDINGSDOCS table.

Table 4 is an example of semi-structured data stored as an XML document.

TABLE 4

```
<deptlist>
    <deptname="Finance">
        <employee>
            <name><first>Bobby</first><last>Darrows</last></name>
            <office phone="x1102"/>
        </employee>
        <employee>
            <name><first>Alice</first><last>LeGlass</last></name>
            <office phone="x1103"/>
        </employee>
        . . .
    </dept>
    <dept name="Engineering">
        <employee>
            <name><first>David</first><last>McKinzie</last></name>
        </employee>
        <employee>
            <name><first>Misha</first><last>Niev</last></name>
            <office phone="x0150"/>
        </employee>
        . . .
    </dept>
</deptlist>
```

Figure 15:
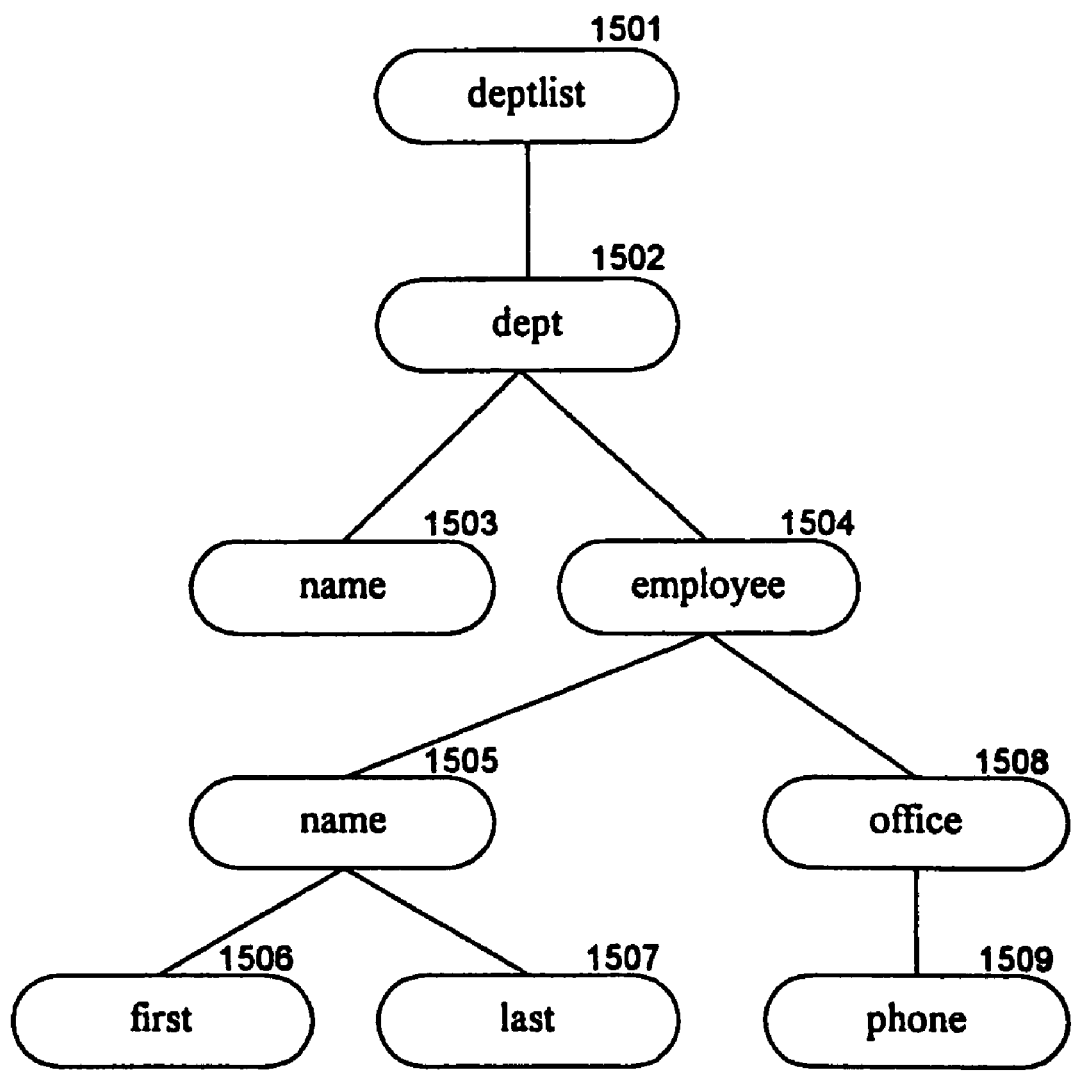
FIG. 15 illustrates the schema of the XML document.

The XML document includes the root element <deptlist> that has a name attribute and that contains a <dept> element corresponding to each department within an organization. Each <dept> element contains an <employee> element for each employee within the department. Each <employee> element contains a <name> element and optionally an <office> element. The <name> element includes a <first> element and <last> element. The <office> element includes a phone attribute. The schema of an XML document may be represented by an XML data type definition ("DTD") of the document. FIG. 15 illustrates the schema of this XML document. As this figure illustrates, the schema is specified as a tree-like hierarchy with the nodes of the tree having parent-child relationships. For example, node 1504 is the parent of nodes 1505 and 1508, which are children of node 1504. Node 1501 corresponds to the <deptlist> element and has one child node 1502, which corresponds to the <dept> element. Node 1502 has two child nodes, 1503 and 1504. Node 1504 corresponds to the name attribute of the <dept> element and node 1504 corresponds to the <employee> element. Node 1504 has two child nodes 1505 and 1508. Node 1505 corresponds to the <name> element and has two child nodes 1506 and 1507. Node 1506 corresponds to the <first> element, and node 1507 corresponds to the <last> element. Node 1508 corresponds to the <office> element and has one child node 1509, which corresponds to the phone attribute.

The mapping technique is particularly useful in situations where a legacy database, such as the example database of Tables 1–3, is to be accessed using queries designed for semi-structured data, such as the example of Table 4. The XML schema may be previously defined and many different applications for accessing data based on that XML schema may have also been defined. For example, one such application may be a query of the data. An example query for semi-structured data may be an XML transform that is designed to input data in XML format and output a subset of the data in XML format. For example, a query for the database of Tables 1–3 may be a request to list the ID of each employee in the "Finance" department. The subset of that data that is output corresponds to the results of the query represented by the XSL transform. One skilled in the art would appreciate that queries can be represented in other formats such as XML-QL. When a legacy database is to be accessed, the data is not stored using XML format. Thus, in one embodiment, a query system inputs a semi-structured query and uses a mapping table to generate a structured query, such as an SQL query, that is appropriate for accessing the legacy database. The mapping technique for generating that mapping table is described in the following.

Table 5 is a portion of the mapping table generated in accordance with the mapping technique that maps the XML schema of Table 4 to the legacy database tables 1–3.

TABLE 5

| Row | ParentName | A/E | ChildName | Table | Pkey | Ckey |
|---|---|---|---|---|---|---|
| 1 | deptlist | E | dept | DEPARTMENTS | | Name |
| 2 | dept | A | name | DEPARTMENTS | Name | Name |
| 3 | dept | E | employee | EMPLOYEES | Dept | ID |
| 4 | employee | E | name | EMPLOYEES | ID | ID |
| 5 | name | E | first | EMPLOYEES | ID | Fname |
| 6 | name | E | last | EMPLOYEES | ID | Lname |
| 7 | employee | E | office | EMPLOYEES | ID | {Bldg, Office} |
| 8 | office | A | phone | BUILDINGSDOCS | {Building, Office} | phone |

The mapping table contains one row for each parent-child relationship of the XML schema. As shown in FIG. 15, the XML schema defines eight parent-child relationships such as the relationship between node 1502 and node 1504. Thus, the mapping table contains eight rows. Each row uniquely identifies a parent-child relationship using the ParentName and ChildName columns. For example, the parent-child relationship of node 1502 and node 1504 is represented by row 3 as indicated by the ParentName of "dept" and the ChildName of "employee." Each row maps the parent-child relationship to the table in the legacy database that corresponds to that relationship. In the example of row 3, the Table column indicates that the "dept-employee" relationship maps to the EMPLOYEES table. The query system could use only the ParentName, ChildName, and Table columns of the mapping table to generate a structured query from a semi-structured query. For example, if the legacy database had used the same column names as defined by the elements of the XML schema (e.g., "employee" rather than "ID"), then only these three columns would be needed to generate the structured query. For example, if the semi-structured query requested an identifier of all employees within the finance department and the DEPARTMENTS table contained an "employee" column rather than an "ID" column, then the query system could input a semi-structured query with only these three columns and generate a structured query. In the more general case where the columns of the legacy database are arbitrarily named, the mapping table includes a parent key column ("PKey") and a child key column ("CKey"). The parent key column contains the name of the column that identifies the parent of the parent-child relationship. The child key column contains the name of the column that identifies the child of the parent-child relationship. For example, in row 3, the parent is identified by the "dept" column and the child is identified by the "ID" column in the EMPLOYEES table. Thus, to generate the structured query to retrieve the ID of an employee within the finance department, the query that uses a select clause of EMPLOYEES.dept="Finance" would be used. Table 5 also includes a column named "A/E" to indicate whether the row corresponds to an element within the semi-structured data or an attribute of an element with semi-structured data. As illustrated by rows 7 and 8, some of the parent and child keys actually consist of multiple columns that uniquely identify a row in the corresponding table. For example, the rows of the BUILDINGSDOCS table are uniquely identified by a combination of the Building and Office columns.

The query system maps the selections within the semi-structured query to selections within a structured query. The following illustrates the basic format of that mapping when the structured query is an SQL format.

SELECT {TABLE}.{CKEY}
FROM {TABLE}
WHERE {TABLE}.{PKEY}=pkey

The TABLE, CKEY, and PKEY parameters are replaced by the corresponding values from the row in the mapping table for the parent-child relationships specified by the selection. In other words, this query will find all the children given the key for the parent. The following illustrates the format of the mapping when the query represents the identification of the idea of all employees within the finance department.

SELECT EMPLOYEES.ID
FROM EMPLOYEES
WHERE EMPLOYEES.Dept="Finance"

The query system also allows chaining of keys to effectively navigate through the hierarchy defined by the semi-structured data. The query system uses the joint concept of relationship databases to effect this chaining of keys.

The following illustrates chaining:

SELECT {TABLE2}.{CKEY2}
FROM {TABLE1}, {TABLE2}
WHERE {TABLE1}.{PKEY1}=pkey && {TABLE1}.{CKEY1}={TABLE2}.{PKEY2}

The TABLE1, PKEY1, and CKEY1 parameters are derived from the first parent-child relationship in the chain, and the TABLE2, PKEY2, and CKEY2 parameters are derived from the second parent-child relationship in the chain. The child key associated with the first parent-child relationship matches the parent key associated with the second parent-child relationship. The following is an example of the chaining to identify the building for the employees of the finance department.

SELECT BUILDINGSDOCS.BUILDING
  FROM EMPLOYEES, BUILDINGSDOCS WHERE EMPLOYEES="Finance" &&
  EMPLOYEES.BLDG=BUILDINGSDOCS.BUILDING &&
  EMPLOYEES.OFFICE=BUILDINGSDOCS.OFFICE In one embodiment, the mapping table also contains the value rows corresponding to each leaf node, that is a node that is not a parent node. The leaf node of 15 are nodes 1503, 1506, 1507, and 1509. In one embodiment, each value row identifies an XML element or attribute, the table in the legacy database that contains an element, and the name of the column in the the value for that element or attribute. Table 6 illustrates the the mapping associated with Tables 1–3 and Table 4.

TABLE 6

| Row | A/E | Name | Table | Key | Value |
|-----|-----|------|-------|-----|-------|
| 9 | A | name | DEPARTMENTS | Name | Name |
| 10 | E | first | EMPLOYEES | Fname | FName |
| 11 | E | last | EMPLOYEES | Lname | LName |
| 12 | A | phone | BUILDINGSDOCS | Phone | Phone |

The "A/E" column identifies whether the row is an attribute or element; the "Name" column identifies the name of the element and attributes; the "Table" column identifies the legacy table; the "Key" column identifies the key for that table; and the "Value" column identifies the name of the column where the value is stored.

Epilogue

While the present invention has been described in terms of the above-illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computer-implemented method comprising:
generating a structured organization to store a collection of semi-structured data; and
collaterally generating a description of how the semi-structured data is stored under the structured organization, wherein the description of how the semi-structured data is stored in the structured organization tracks hierarchical information of the semi-structured data and includes storage location information of the structured organization;
wherein the storage location information of the structured organization identifies a first and a second storage location in the structured organization of a parent and a child node of a parent and child node pair of the semi-structured data.

2. The method of claim 1, wherein said collateral generation of a description comprises generating descriptive entries for a description table, with each descriptive entry identifying the first and second storage location of a storage table for the parent and the child node of the parent and child node pair of the semi-structured data.

3. The method of claim 2, wherein said collateral generation of a description further comprises generating for each of a selected one or ones of said descriptive entries a context qualifier for at least a selected one of the parent and the child node.

4. The method of claim 1, wherein said generation of a structured organization comprises creating relational storage tables with rows and columns in a normalized manner.

5. An apparatus comprising:
a storage medium having stored therein a plurality of programming instructions designed to generate a structured organization to store a collection of semi-structured data, when executed, and to collaterally generate a description of how the semi-structured data are stored under the structured organization, wherein the description of how the semi-structured data is stored in the structured organization tracks hierarchical information of the semi-structured data and includes storage location information of the structured organization, wherein the storage location information of the structured organization identifies a first and a second storage location in the structured organization of a parent and a child node of a parent and child node pair of the semi-structured data; and
a processor coupled to the storage medium to execute the programming instructions.

6. The apparatus of claim 5, wherein the programming instructions are designed to generate the description by generating a description table having a plurality of descriptive entries, with each descriptive entry identifying the first and the second storage location of a storage table of the structured organization for the parent and the child node of the parent and child node pair of the semi-structured data.

7. The apparatus of claim 6, wherein said programming instructions are further designed to generate for each of a selected one or ones of said descriptive entries a context qualifier for at least a selected one of the parent and the child node.

8. The apparatus of claim 5, wherein said programming instructions are designed to generate a structured organization by creating relational storage tables with rows and columns in a normalized manner.

9. The apparatus of claim 5, wherein said programming instructions are a subset of a larger collection of programming instructions implementing a selected one of a database manager and a development toolkit that facilitates development of applications that access databases.

10. An article of manufacture comprising:
a recordable medium having recorded thereon a plurality of programming instructions for use to program a system having a processor for executing programming instructions, to enable the system to generate a structured organization to store a collection of semi-structured data, and to collaterally generate a description of how the semi-structured data are stored under the structured organization, wherein the description of how the semi-structured data is stored in the structured organization tracks hierarchical information of the semi-structured data and includes storage location information of the structured organization, wherein the storage location information of the structured organization identifies a first and a second storage location in the structured organization of a parent and a child node of a parent and child node pair of the semi-structured data.

11. The article of claim 10, wherein said programming instructions enable the system to collaterally generating a description by generating a description table having a plurality of descriptive entries, with each descriptive entry identifying the first and the second storage location of a storage table for the parent and the child node of the parent and child node pair of the semi-structured data.

12. The article of claim 11, wherein said programming instructions further enable the system to generate for each of a selected one or ones of said descriptive entries a context qualifier for at least a selected one of the parent and the child node.

13. The article of claim 10, wherein said programming instructions enable the system to generate a structured organization by creating relational storage tables with rows and columns in a normalized manner.

14. The article of claim 10, wherein said programming instructions are a subset of a larger collection of programming instructions implementing a selected one of a database manager and a development toolkit that facilitates development of applications that access databases.

15. A computer-implemented method comprising:
generating a semi-structured data organization for a collection of structured data; and
collaterally generating a description of correspondence between the generated semi-structured data organization and the collection of structured data;
wherein said collateral generation of a description comprises generating descriptive entries for a description table, with each descriptive entry identifying a first and a second storage column of a storage table of the structured data for a parent and a child node of a parent and child node pair of the generated semi-structured data organization.

16. The method of claim 15, wherein said collateral generation of a description further comprises generating for each of a selected one or ones of said descriptive entries a context qualifier for at least a selected one of the parent and the child node.

17. The method of claim 15, wherein said generation of a semi-structured data organization comprises creating an extensible mark-up language (XML) data structure for a collection of relational tables.

18. An apparatus comprising:
a storage medium having stored therein a plurality of programming instructions designed to generate a semi-structured data organization for a collection of structured data, when executed, and to collaterally generate a description of correspondence between the semi-structured data organization and the structured data; and
a processor coupled to the storage medium to execute the programming instructions, wherein the programming instructions are designed to generate the description by generating a description table having a plurality of descriptive entries, with each descriptive entry identifying a first and a second storage column of a storage table of the structured data for a parent and a child node of a parent and child node pair of the generated semi-structured data orgamzation.

19. The apparatus of claim 18, wherein said programming instructions are further designed to generate for each of a selected one or ones of said descriptive entries a context qualifier for at least a selected one of the parent and the child node.

20. The apparatus of claim 18, wherein said programming instructions are designed to create an extensible mark-up language (XML) data structure for a collection of relational tables.

21. The apparatus of claim 18, wherein said programming instructions are a subset of a larger collection of programming instructions implementing a selected one of a database manager and a development toolkit that facilitates development of applications that access databases.

22. An article of manufacture comprising:
a recordable medium having recorded thereon a plurality of programming instructions for use to program a system having a processor for executing programming instructions, to enable the system to generate a semi-structured data organization for a collection of structured data, and to collaterally generate a description of correspondence between the semi-structured data organization and the structured data, wherein said programming instructions enable the system to collaterally generate a description by generating a description table having a plurality of descriptive entries, with each descriptive entry identifying a first and a second storage column of a storage table of the structured data for a parent and a child node of a parent and child node pair of the generated semi-structured data organization.

23. The article of claim 22, wherein said programming instructions further enable the system to generate for each of a selected one or ones of said descriptive entries a context qualifier for at least a selected one of the parent and the child node.

24. The article of claim 22, wherein said programming instructions enable the system to create an extensible mark-up language (XML) data structure for a collection of relational tables.

25. The article of claim 22, wherein said programming instructions are a subset of a larger collection of programming instructions implementing a selected one of a database manager and a development toolkit that facilitates development of applications that access databases.

* * * * *

UNITED STATES PATENT AND TRADEMARK OFFICE
CERTIFICATE OF CORRECTION

PATENT NO. : 7,124,144 B2
APPLICATION NO. : 09/921010
DATED : October 17, 2006
INVENTOR(S) : Christianson et al.

It is certified that error appears in the above-identified patent and that said Letters Patent is hereby corrected as shown below:

In the Specification:

Column 3, line 58, delete "6".

Column 13, line 15, add --table that contains-- after the second instance of "the".

Column 13, line 16, add --four value rows for-- after the first instance of "the".

In the Claims:

In line 17 of claim 18 (column 16, line 5) change "orgarnzation" to --organization--.

Signed and Sealed this

Twenty-ninth Day of April, 2008

JON W. DUDAS
*Director of the United States Patent and Trademark Office*